United States Patent
Huang

(10) Patent No.: US 8,230,428 B2
(45) Date of Patent: Jul. 24, 2012

(54) DATA MANAGEMENT JOB PLANNING AND SCHEDULING WITH FINISH TIME GUARANTEE

(75) Inventor: Lan Huang, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 1191 days.

(21) Appl. No.: 12/034,427

(22) Filed: Feb. 20, 2008

(65) Prior Publication Data
US 2009/0210878 A1    Aug. 20, 2009

(51) Int. Cl.
*G06F 9/46* (2006.01)
(52) U.S. Cl. ........ 718/102; 718/100; 718/101; 718/103; 718/104
(58) Field of Classification Search .................. 718/100, 718/101, 102, 103, 104, 107, 105
See application file for complete search history.

(56) References Cited

U.S. PATENT DOCUMENTS

| | | | | |
|---|---|---|---|---|
| 5,392,430 | A * | 2/1995 | Chen et al. | 718/102 |
| 5,437,032 | A * | 7/1995 | Wolf et al. | 718/103 |
| 6,353,844 | B1 * | 3/2002 | Bitar et al. | 718/102 |
| 7,502,747 | B1 * | 3/2009 | Pardo et al. | 705/7.13 |
| 7,958,507 | B2 * | 6/2011 | Santos et al. | 718/102 |
| 2004/0228344 | A1 | 11/2004 | Lu | |
| 2005/0044209 | A1 | 2/2005 | Doyle et al. | |
| 2005/0283348 | A1 | 12/2005 | Tsui et al. | |
| 2006/0015871 | A1 | 1/2006 | Emaru et al. | |
| 2006/0101224 | A1 | 5/2006 | Shah et al. | |
| 2006/0173994 | A1 | 8/2006 | Emeis et al. | |
| 2007/0083500 | A1 | 4/2007 | Zibitsker | |
| 2010/0245890 | A1 * | 9/2010 | Chakraborty | 358/1.15 |

OTHER PUBLICATIONS

Lehr, Matthew R. et al; "StarBase: A Firm Real-Time Database Manager for Time-Critical Applications," IEEE, 1995, pp. 317-322.
Bachman, Eitan et al, "Analysis of Methods for Scheduling Low Priority Disk Drive Tasks," Proceedings of SIGMETRICS 2002 Conference, Jun. 15-19, 2002.
J. Zhang, P. Sarkar, and A. Sivasubramaniam, *Achieving completion time guarantees in an opportunistic data migration scheme*, SIGMETRICS Performance Evaluation Review, 33, 4 (2006), 11-16.
Doucher, J.R. and Bolosky, W.J., Progress-based regulation of low-importance processes. *In SOSP '99: Proceedings of seventeenth ACM symposium on Operating systems principles* (New York, NY, USA 1999), ACM Press, pp. 247-260.

* cited by examiner

*Primary Examiner* — Emerson Puente
*Assistant Examiner* — Willy W Huaracha
(74) *Attorney, Agent, or Firm* — Shimokaji & Assoc., PC

(57) ABSTRACT

A method is disclosed for scheduling data management jobs on a computer system that uses a dual level scheduling method. Macro level scheduling using a chained timer schedules the data management job for execution in the future. Micro level scheduling using an algorithm controls the actual dispatch of the component requests of a data management job to minimize impact on foreground programs.

18 Claims, 3 Drawing Sheets

DATA MANAGEMENT JOB PLANNING AND SCHEDULING WITH FINISH TIME GUARANTEE

BACKGROUND OF THE INVENTION

The present invention relates generally to the field of information data management and, more particularly, to allocating resources on a computer server to perform background management activities and foreground primary activities.

When a background backup job in a personal computer starts, often times, people experience slow response time, slow down of network connection, and even frozen keyboard response. Similar impacts can occur in computer servers managing data. Managing large scale data storage system with terabytes or even petabytes of enterprise data presents daunting challenges. Management events for the data are usually periodically scheduled by the system or manually driven by an operator. Periodically scheduling management tasks typically is not responsive to the system's changing needs and a periodic, scheduled management job may not be performed at the best time. Manual scheduling lacks any mechanism to isolate any performance impacts of the management jobs from the primary applications. These approaches can either adversely affect the user utilization or over-provision resources to ensure a certain level of service quality.

Prior art of related fields generally falls into three categories: systems providing performance isolation among processes, various scheduling methods, and storage management software systems. The idea of performance isolation comes up in several contexts: process scheduling in operating system, resource sharing among virtual machines on the same physical devices, and application level workload management. To differentiate various classes of applications, UNIX-like operating systems allow users to set the priority of an application through the nice command. A lower priority process always yields to a higher priority process. A drawback of priority-based scheduling is that it does not provide a predictable finish time or a predictable share for any process.

QLinux is a Linux® real time operating system which provides quality of service guarantees for multimedia applications. QLinux focuses on serving multimedia applications. Virtual machine systems Xen® and VMware® deal with the issue of sharing resources among multiple virtual machines at the same physical instance. Xen® and VMware® provide basic resource (CPU, network, and storage) isolation among multiple virtual machines. The isolation is enforced at the virtual machine level, but not at application or process level. IBM® Enterprise Workload Manager (EWLM) provides performance monitoring and resource management among applications on various platforms. EWLM provides performance isolation at application level.

Many scheduling methods have been proposed for resource sharing with performance isolation on various types of physical resources, including networks, CPU, and disk bandwidth. Start time Fair Queueing (SFQ) is a scheduling algorithm that achieves fairness and work-conserving performance isolation among multiple resource competitors. It provides proportional resource sharing according to the weight each stream reserves. SFQ has also been adapted for resource sharing on a storage service including SFQ(D), a further refinement of SQF, Four-tag Start-time Fair Queueing (FSFQ (D)), a further refinement of SFQ(D), and Request Windows algorithm. These methods all share the same assumptions of inaccurate or unknown resource capacity. Sledrunner, an IBM® memory management system, provides performance guarantees through I/O rate throttling. Potentially, Sledrunner can be non-work-conserving when automatic throttling mode is on. In this mode, the incoming request rate allowed may be less than the actual resource capacity of the storage server. Adaptive rate control approach, introduced in *SIGMETRICS Performance Evaluation Review*, 33, 4 (2006), 11-16 by J. Zhang, P. Sarkar, and A. Sivasubramaniam, has the non-work-conserving issue similar to the Sledrunner system. Work conserving is a key requirement for maximizing resource utilization. Since the workload is dynamic, a non-work-conserving scheme may not be able to capture the frequently changing pattern and consequently under-utilize the throughput ranging from 5% to 40% in various cases.

Existing storage management software systems include IBM Tivolli® Storage Manager (TSM), HP OpenView® Management software, and Veritas® Volume Manager. Their management processes typically run periodically at a preset time of the day. While running, it often lacks the mechanism to share the resources proportionally with the primary applications. Microsoft's® MS Manners is a feedback-based method to improve the performance of the high importance jobs and reduce the contention. MS Manners does not provide any completion time guarantee or proportional resource sharing.

A scheduling system that effectively controls the background data management activities in a large scale storage system would offer benefits in efficiency, minimizing adverse impacts on foreground program jobs. A better method of scheduling management jobs is needed to more optimally perform background management jobs to minimize adverse impacts on foreground primary activities.

SUMMARY OF THE INVENTION

In one embodiment of the present invention, a method for use with a data management system comprises scheduling a data management job using a macro level chained timer to schedule a future data management job and executing the data management job according to a finish time generated by the micro level virtual clock scheduler.

In another embodiment of the present invention, a method includes coupling a management job planner to a job container populated with a first group of data management jobs according to the management job planner; coupling the job container to a timer that timestamps each of the data management jobs to designate a next data management job; and coupling the job container to a queue populated with a second group of data management jobs including the next data management job, transferred according to a coupled admission controller, the queue of data management jobs processed using a request scheduler to dispatch the next data management job from the queue according to an algorithm and considering a feedback input from a resource meter to the request scheduler.

In yet another embodiment of the present invention, a method for scheduling data management jobs on a computer system comprises scheduling a data management job using a macro level chained timer to schedule a time deadline for a future data management job; and executing component requests of a data management job using a micro level virtual clock to control performing the data management job according to an algorithm $FT(i,j) = FT(i-1, j) + 1/(\phi_j \times C)$, where $FT(i, j)$ represents finish time for the of a current component request i of the data management job j, $FT(i-1, j)$ stands for a finish time of a previous component request i−1 of the data management job j, ϕj stands for a weight of resource reserved for the current data management job, and C stands for overall throughput capacity.

These and other features, aspects, and advantages of the present invention will become better understood with reference to the following drawings, description, and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides a system and method of information job management in a computer-based memory using a two-tier scheduling method at both the macro level and the micro level. The system is especially useful in large scale data management to process large amounts of data.

Embodiments of the invention differ from the prior art by continually planning management tasks in the future at the macro level and, at the micro level dispatching data requests for data management jobs that are controlled to ensure primary, foreground jobs are minimally impacted. Embodiments of the invention differ from prior art methods by accomplishing the following: (a) increase system resource utilization, (b) decrease impact seen by the primary jobs, (c) achieve relaxed performance goals of the management jobs, i.e., completion deadline, and (d) automate the data management.

Figure 1:
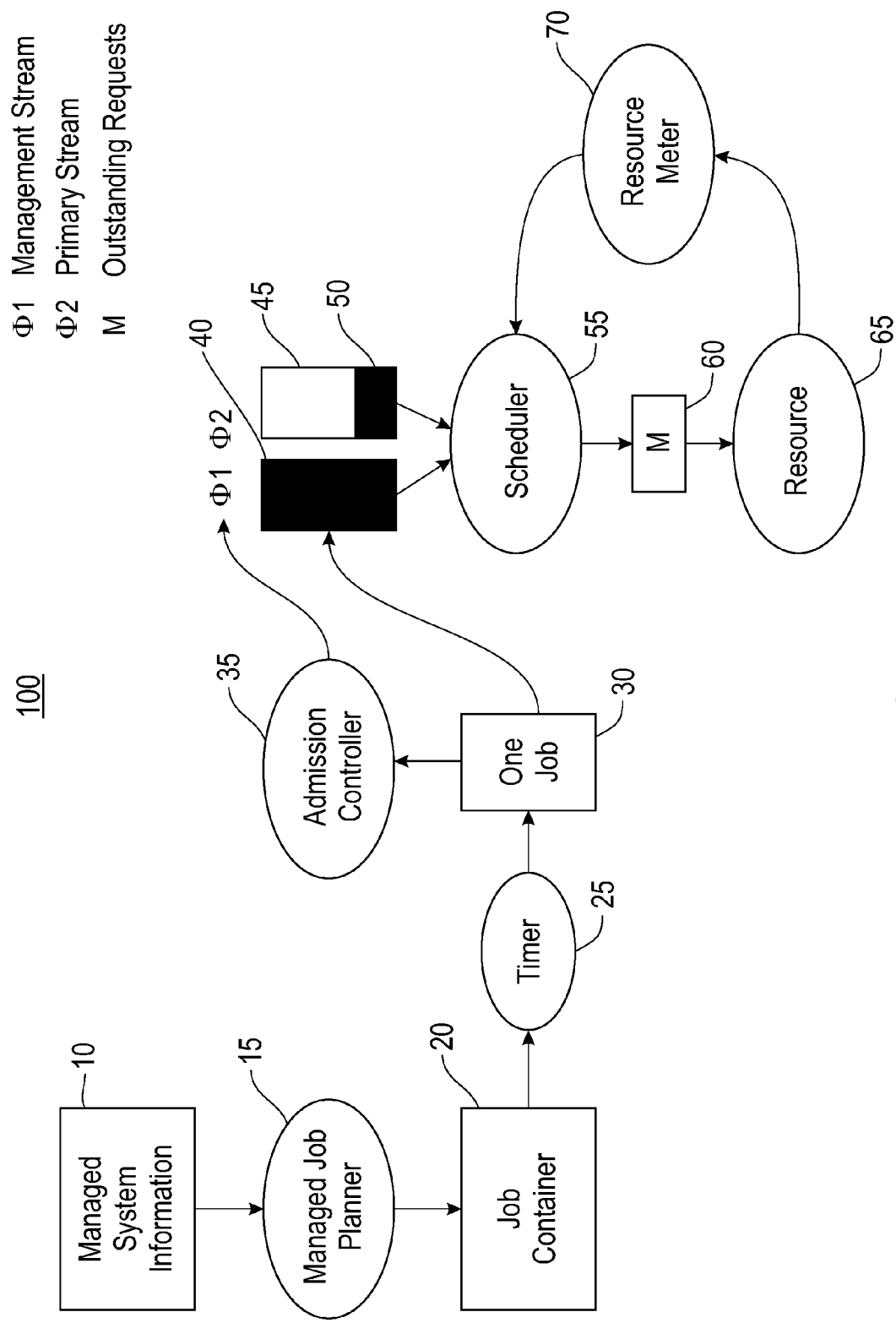
FIG. 1 shows a block diagram of data management software architecture structures in accordance with an embodiment of the present invention.

FIG. 1 shows a block diagram of the data management software architecture 100. The managed system information 10 may first be operated on in the procedure flow by a management job planner 15 that may schedule and plan future background management jobs based on the information available at the managed system information 10. The jobs may be stored in a job container queue 20. A timer 25 may be used to register a time period to execute a management job. An initial time for a first management job may be registered by the timer 25 to execute the first management job. When a first management job is dispatched, another execute time may be registered for the next immediate management job 30. When this subsequent time period registered by the timer 25 is due, the next immediate management job 30 may be evaluated for execution based on the registered time by the timer 25. This next immediate management job 30 may also specify a finish time deadline. For example, a first job is assigned an execute time by the timer 25. At the scheduled time, the first job is evaluated for execution, and if the resources are available, the first job is dispatched for execution. Then, the timer 25 may register an execute time for the next immediate management job 30.

The admission controller 35 may calculate the resource reservation weight ($\phi_1$) based on the time deadline and decide if the system can meet the requirement. If the system can meet the requirement as may be determined by the admission controller 35, the management job 30 may be admitted to the stream queue 45 and the management stream queue 40 for execution. Referring to the example above, during the evaluation at the execute time, the admission controller 35 may evaluate the available central processing unit's current ability to perform the management job. The admission controller 35 calculates $\phi_1$, and if resources are sufficient, the job is admitted and dispatched. The remaining resource $\phi_2$, which is equal to $1-\phi_1$, may be used by the primary application(s).

For example, a request for a management job 30 may be initiated at the managed system information 10. The request may be admitted to the data management job container 20 under the control of the management job planner 15, which may schedule and plan the management job. The timer 25 registers a time period within which to perform the management job 30. This time period can include an earliest time and a latest time to start to execute the management job 30. This time period may be used by the system to evaluate the management job 30 for execution within an execute time window beginning at the start window between the earliest and latest time to start time as registered by the timer 25, and may also include a finish time deadline. After management job 30 is dispatched for execution, the timer 25 may register an execute time for a next immediate management job to execute according to a next the first job is dispatched for execution. Then, the timer 25 may register an execute time window for a next immediate management job 30.

The primary stream queue 45 and the management stream queue 40 have their own separate queues 40 and 45 to hold bursts of management job requests. The management stream queue 40 may hold all the requests planned in advance and may take away any spare slots in the queue if any are available. The outstanding stream queue 50 may hold bursts of outstanding requests awaiting scheduled dispatch. The request scheduler 55 may compute the finish time (FT) timestamp tag for each request in the queues 40, 45, and 50 belonging to a data management job. The request scheduler 55 may dispatch the next M requests 60 belonging to a data management job in the outstanding stream queue 50 with minimum FT timestamp tags to the underlying system for execution. The initial estimate of the resource capacity 65 about the underlying system may not be accurate at all times, due to various kinds of dynamics. A resource meter 70 constantly measures the actual resource capacity 65 and feeds the information back to the request scheduler 55 on a feedback input. The resource meter 70 is piggybacked with the normal job execution. The request scheduler 55 may receive all requests belonging to a data management job and may dispatch them in a proper order to achieve resource sharing. Where to place the request scheduler 55 may depend on which resources the system may be configured to manage. The invention may be designed to control the management jobs on a file system interface, such as a GPFS cluster file system. Every file system operation is FT tagged and dispatched in the order tagged by the request scheduler 55.

Macro Level Scheduling

Figure 2:
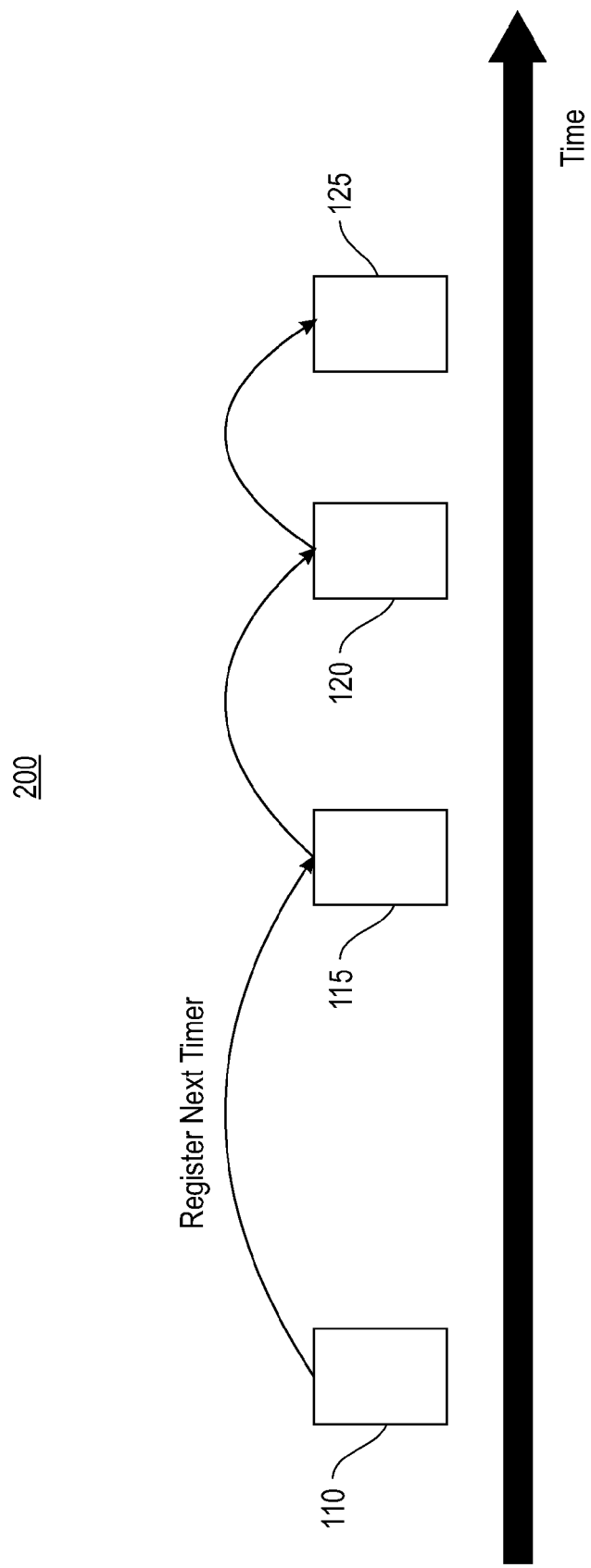
FIG. 2 is a timing diagram of a chained timer scheduling method used for macro level scheduling to organize the unit management jobs in accordance with an embodiment of the present invention.

FIG. 2 is a timing diagram of a chained timer scheduling method 200 used for macro level scheduling to organize the management jobs. The management jobs may be composed of a number of component requests. The conglomerate of component requests belongs to one job. The management job may be scheduled at the macro level for timely execution. An FT timestamp for the very first data management job 110 may be registered by a FT timer in the system. For example, when the data management job 110 is dispatched, the system may register a FT timer for the next job in the future. The FT timer may register the FT with a timestamp on the first data management job 110 that may determine a deadline for timely execution of the first data management job 110. So as first data management job 110 is dispatched, a second data management job 115 FT timer may be registered by a timestamp deadline for the second data management job 115. The FT timer may be reached for the second data management job 115, which may cause dispatch of the second data management job 115, and may result in a third data management job 120 FT timer being registered. When that registered timestamp is reached, the third data management job 120 may be dispatched and a fourth data management job 125 FT timer registered. The timer may wake up a job executor to make sure that jobs 110, 115, 120, and 125 may be executed timely.

The chained timer method may avoid overloading the system with too many states and may ensure timely execution of all the planned jobs. A start time window may designate a time to start the management job that may be registered by the FT timer to provide an optimization window of a timestamp earliest start time and a latest time used by the scheduler as the best timing to start the job to meet the finish time (FT). The system status is fed back to the scheduler 55 as shown in FIG. 1. For example, in the case of a data backup procedure job performed daily, the FT time stamp may specify a 3:00 AM best start time to perform the data backup. A second time, such as a batch data transfer to another memory cache, may be assigned a best start time of 3:30 AM.

If the system workload is over a threshold at the start time of the optimization window for each management job 110, 115, 120, and 125, the management job at issue may be delayed for a better timing later, but no later than the latest start time as determined by the FT timer to meet the FT timestamp. This method ensures that management jobs 110, 115, 120, and 125 may be executed timely and may create flexibility for choosing a right timing for the system. Turning again to the example above, the data backup job may be assigned a best start time of 3:00 AM and a latest start time of 3:15 AM, with the batch data transfer to memory cache job perhaps assigned a best start time of 3:30 AM and a latest start time of 3:38 AM. However, required system resources are not available at the best start time for either job, so the data backup instead starts at 3:08 AM and the batch data transfer job at 3:33 AM. Both jobs are begun by the latest start time and timely completed as determined by the FT timestamp.

The system may generate management jobs in two modes: proactive and reactive. In the reactive management job generation mode, a management job may be started in response to a system alert from a status monitor agent. For example, when the available storage capacity drops below a preset threshold, an alert may be generated for the management job planner 15. The management job planner 15 may take actions in response to the alert, e.g., to delete some temporary files to create more free space. In the proactive job generation mode, the jobs may be precomputed for future execution by the management job planner 15. The benefit of proactive job planning may allow the scheduler 55 to set a time window to decide the best timing for starting the job, such as when the system has free resources.

As an example, suppose a management job is generated in a reactive mode. A status monitor agent that may be implemented on job container 20 sends an alert to the management job planner 15 when the available storage capacity drops below the preset threshold, causing additional management jobs to exit from the management job planner. If a management job is generated in a proactive mode, the job may be precomputed for future execution by the management job planner 15 according to the best timing for the management job to complete the management job by a certain time. The scheduler 55 can use the precomputed time to in turn designate an earliest start time and a latest start time to meet the precomputed time to complete the time based on, for example, free resources to accomplish the management job, as further explained below.

To expire a data file being managed, the system can either delete the file, or archive it to tape. To delete the file properly from the storage media, it may require multiple overwrites, which can consume considerable storage bandwidth. The system may order all the files in an expiration time order. Starting from the first file to be expired, the data management process may add the files in expiration order into a single job. The formation of a job may be complete after meeting one of the following conditions: a) the total number of bytes for all the files in this job reach a predefined threshold B, or b) the expiration time gap between the last file in the job and the next following file to be expired is longer than a threshold T. Meeting either one or both of conditions a) and b) may guarantee that files with close expiration time may be processed in a batch. The earliest starting time for a job is the expiration time of the last file in the job. In the periodic approach, the period is almost impossible to get right. The period can be too short when files expire sparsely and too long when files expire densely over time. Compared to periodic file expiration, this proactive job generation method in the invention may effectively expire files in a more timely fashion and may avoid running too frequently.

Micro Level Scheduling

Figure 3:
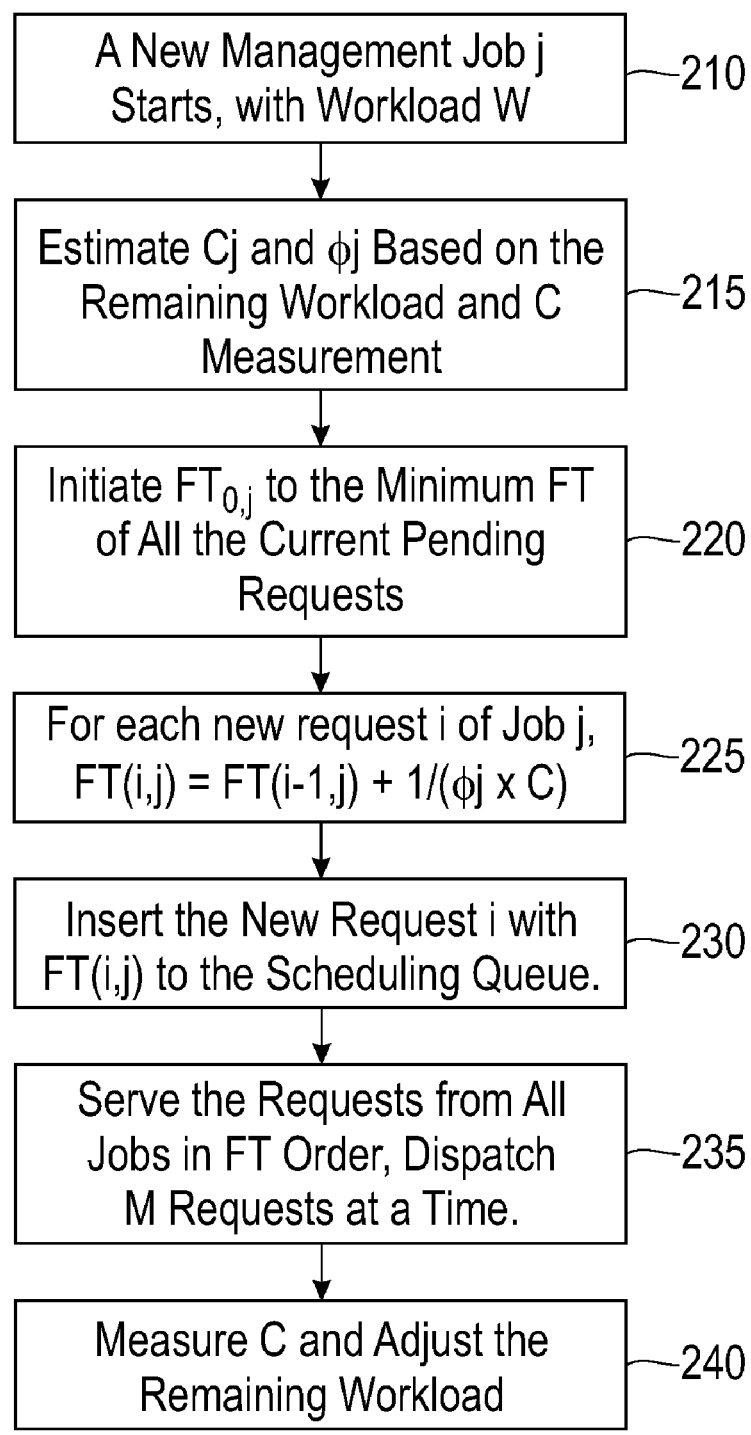
FIG. 3 is a process flow chart showing a scheduling timer method used for micro level scheduling to organize the unit management jobs in accordance with an embodiment of the present invention.

FIG. 3 is a process flow chart showing scheduling timer method 300 used for micro level scheduling to organize the unit management jobs. Micro level scheduling may schedule the conglomerate individual component requests of a management job at the micro level. The micro level scheduling may be implemented on the scheduler 55 and may use a variation of virtual clock (VC) scheduling, which may satisfy the goals of work-conserving and proportional resource sharing. This implemented micro level scheduling may schedule the component requests of the data management job. VC computes the timestamp of each request and dispatches them for execution in order.

At step 210, a new data management job j may start with workload W. The scheduler 55 may estimate Cj and $\phi j$ based on the remaining workload and C measurement in step 215. Resource capacity is reflected in throughput Cj in operations per second (OPS). Cj may be equal to $\phi j \cdot C$, where $\phi j$ is the weight of resource jth stream reserves and C is the total throughput capacity. In step 220, the scheduler 55 initiates $FT_{0,j}$ to the minimum FT of all the current pending requests. In step 225, for each new request i of job j, an FT may be computed according to $FT(i,j)=FT(i-1, j)+1/(\phi j \times C)$, where $FT(i,j)$ may be viewed as the finish time of the $i^{th}$ request of the job j (e.g. the current request component), and $FT(i-1, j)$ may be viewed as the finish time for $i^{th}-1$ request of the job j (e.g. the previous request component). In step 230, a new request i with $FT(i,j)$ may be inserted into the scheduler 55. The job requests for all the jobs may be served in FT order in step 235. The scheduler 55 may be operated to dispatch M requests at a time. In step 240, the resource meter 70 may measure C to input into the scheduler 55 and may adjust the remaining workload. Step 240 may ensure a completion deadline for the management job is met.

It should be understood, of course, that the foregoing relates to exemplary embodiments of the invention and that modifications may be made without departing from the spirit and scope of the invention as set forth in the following claims.

I claim:

1. A method for use with a data management system, comprising:
    scheduling data management jobs using a chained timer and using a virtual clock scheduler to control performing the data management jobs-according to an algorithm that includes the function $FT(i,j)=FT(i-1, j)+1/(\phi j \times C)$, where $FT(i,j)$ represents finish time of a current component request i of a first data management job j among the data management jobs, $FT(i-1, j)$ stands for finish time of a previous component request i−1 of the first data management job j, $\phi j$ stands for a weight of resource reserved for the first data management job j, and C stands for overall throughput capacity; and
    executing the first data management job according to a finish time generated by the virtual clock scheduler.

2. The method of claim 1, wherein the chained timer is implemented in a management job planner.

3. The method of claim 1, wherein the virtual clock scheduler is implemented in a request scheduler.

4. The method of claim 1, including:
    coupling a management job planner to a job container populated with the data management jobs according to the management job planner;
    coupling the job container to the chained timer that timestamps the data management jobs and designates a next data management job among the data management jobs;
    coupling the job container to at least one queue populated with management jobs according to a coupled admission controller;
    operating the at least one queue to process the data management jobs using a request scheduler to dispatch the data management jobs from the queue according to the algorithm and considering a feedback input from a resource meter to the request scheduler.

5. The method of claim 4, wherein the resource meter constantly measures an actual resource capacity.

6. The method of claim 4, wherein the request scheduler coupled to the at least one queue receives the data management jobs and dispatches the data management jobs in a proper order to achieve resource sharing.

7. A method for managing data on a computer-based memory to schedule the data management jobs, comprising:
    coupling a management job planner to a job container populated with a first group of the data management jobs according to the management job planner;
    coupling the job container to a timer that timestamps each of the data management jobs to designate a next data management job among the data management jobs;
    coupling the job container to a queue populated with a second group of the data management jobs including said next data management job, transferred according to a coupled admission controller, said queue of the data management jobs processed using a request scheduler to dispatch the next data management job from the queue according to an algorithm and considering a feedback input from a resource meter to the request scheduler; and
    operating the request scheduler to meet a finish time according to an FT time computed using an algorithm that includes a function $FT(i,j)=FT(i-1, j)+1/(\phi j \times C)$, where $FT(i,j)$ represents a finish time for a current component request i of a first data management job j among the data management jobs, $FT(i-1, j)$ stands for finish time of a previous component request i−1 of the first data management job j, and $\phi j$ stands for a weight of resource of the first data management job, and C stands for overall throughput capacity.

8. The method of claim 7, including measuring the actual resource capacity continually using the resource meter to provide constant feedback input to the request scheduler.

9. The method of claim 7, including scheduling a second data management job using a chained timer to schedule the second data management job on the management job planner for future execution.

10. The method of claim 9, including scheduling the second data management job using a virtual clock to control performing the second data management job on the request scheduler.

11. The method of claim 10, including executing the second data management job according to a finish time generated by the virtual clock on the request scheduler.

12. The method of claim 7, including dispatching a plurality of the data management jobs from the request scheduler in a proper order according to a chained timer scheduling at the management job planner and virtual clock scheduling at the request scheduler.

13. A method for scheduling data management jobs on a computer system, comprising:
    scheduling a first data management job among the data management jobs using a chained timer to schedule a time deadline for a second data management job among the data management jobs; and
    executing component requests of the first data management job using a virtual clock to control performing the first data management job according to an algorithm $FT(i,j)=FT(i-1, j)+1/(\phi j \times C)$, where $FT(i,j)$ represents finish time of a current component request i of the first data management job j, $FT(i-1, j)$ stands for a finish time of a previous component request i−1 of the first data management job j, $\phi j$ stands for a weight of resource reserved for the first data management job, and C stands for overall throughput capacity.

14. The method of claim 13, including:
    populating a data management job container with the data management jobs according to a management job planner operating the chained timer;
    time stamping the data management jobs exiting the job container to designate a next data management job among the data management jobs; and
    populating a plurality of queues with the data management jobs according to a coupled admission controller, with at least one of the queued data management jobs processed using a request scheduler to dispatch requests belonging to the at least one of the data management jobs from the queues according to the virtual clock algorithm.

15. The method of claim 13, including dispatching a request of one of the data management jobs from the request scheduler in a proper order according to the scheduling.

16. The method of claim 13, wherein the scheduling occurs proactively.

17. The method of claim 13, wherein the scheduling occurs reactively.

18. The method of claim 14, including controlling the dispatch of at least one queue with an admission controller using a calculated weight of resources reserved, $\phi j$, based on the time deadline to decide if the system can meet the requirement.

* * * * *